(12) United States Patent
Wu et al.

(10) Patent No.: US 9,983,776 B1
(45) Date of Patent: May 29, 2018

(54) SOFTWARE SYSTEM FOR DYNAMIC FEATURE EXTRACTION FOR STRUCTURAL HEALTH MONITORING

(71) Applicant: Bentley Systems, Incorporated, Exton, PA (US)

(72) Inventors: Zheng Yi Wu, Watertown, CT (US); Jie Zhao, Exton, PA (US); Jingcheng Li, Exton, PA (US); Jingyuan Zhang, Exton, PA (US)

(73) Assignee: Bentley Systems, Incorporated, Exton, PA (US)

( * ) Notice: Subject to any disclaimer, the term of this patent is extended or adjusted under 35 U.S.C. 154(b) by 197 days.

(21) Appl. No.: 15/199,409

(22) Filed: Jun. 30, 2016

(51) Int. Cl.
| | |
|---|---|
| *G06F 3/048* | (2013.01) |
| *G06F 3/0484* | (2013.01) |
| *G06F 3/0482* | (2013.01) |
| *G01M 99/00* | (2011.01) |

(52) U.S. Cl.
CPC ......... *G06F 3/04847* (2013.01); *G01M 99/00* (2013.01); *G06F 3/0482* (2013.01)

(58) Field of Classification Search
CPC .............. G06F 3/04847; G06F 3/0482; G06F 17/5009; G01M 99/00; H04W 4/021; H04M 1/72569; G06K 9/00624; G06K 9/6247; G06K 9/623
See application file for complete search history.

(56) References Cited

U.S. PATENT DOCUMENTS

| | | | |
|---|---|---|---|
| 7,908,095 B2 | 3/2011 | Liu et al. | |
| 2009/0306907 A1* | 12/2009 | Ihn ...................... | G01M 5/0041 |
| | | | 702/34 |
| 2011/0208678 A1 | 8/2011 | Bougaev et al. | |

(Continued)

OTHER PUBLICATIONS

Andersen, P., "Identification of civil engineering structures using vector ARMA models, Ph.D., Dept. of Building Technology and Structural Engineering," Aalborg Univ., Aalborg, Denmark, 1997, pp. 1-29.

(Continued)

*Primary Examiner* — Jeffrey A Gaffin
*Assistant Examiner* — Ayesha Huertas Torres
(74) *Attorney, Agent, or Firm* — Cesari and McKenna, LLP; James A. Blanchette

(57) ABSTRACT

In an example embodiment, a dynamic feature extraction tool receives a data set from a SHM system that includes a plurality of sensors affixed to a structure (e.g., a bridge, dam, building, etc.), the data set including at least one of ambient vibration data or earthquake vibration data. A solution method is selected from among, for example, time domain analysis, frequency domain decomposition or eigensystem realization analysis. The dynamic feature extraction tool guides a user to select at least one parameter value used in the selected solution method from a subset of determined-effective parameter values computed by the software tool. The dynamic feature extraction tool then automatically performs the selected solution method on the data set using (Continued)

the selected at least one parameter value to determine dynamic features (e.g., frequencies or modal shapes), and displays a graphical representation of the dynamic features in a UI.

20 Claims, 9 Drawing Sheets

(56) References Cited

U.S. PATENT DOCUMENTS

2014/0058709 A1* 2/2014 Machado Viana .. G01M 5/0033 703/2

OTHER PUBLICATIONS

Brincker, R., Zhang, L., and Andersen, P., "Modal Identification of Output-only Systems using Frequency Domain Decomposition," Institute of Physics Publishing, Ltd, Smart Materials and Structure, vol. 10, No. 3, Jun. 2001, pp. 441-445.

Carden, Peter E., et al., "ARMA Modelled Time-Series Classification for Structural Health Monitoring of Civil Infrastructure," Science Direct, Elsevier Ltd., Mechanical Systems and Signal Processing, vol. 22, Issue 2, Feb. 2008, pp. 295-314.

Jame, G.H., Came, T.G. and Lauffer, J.P., "The Natural Excitation Technique for Modal Parameter Extraction from Operating Wind Turbines," Report No. SAND92-1666, UC-261, Sandia National Laboratories, Feb. 1993, pp. 1-46.

Jame, G.H., Came, T.G. and Mayes, R.L., "Modal Parameter Extraction from Large Operating Structures Using Ambient Excitation," Proc. 14th Int. Modal Analysis Conf. Dearborn, MI, 1996, pp. 77-83.

Kohler, M.D., Davis, P.M., and Safak, E., "Earthquake and Ambient Vibration Monitoring of the Steel-Frame UCLA Factor Building," Earthquake Spectra, vol. 21, No. 3, Aug. 2005, pp. 1-22.

U.S. Appl. No. 14/563,668, filed Dec. 8, 2014 by Zheng Yi Wu et al. for Optimizing Sensor Placement for Structural Health Monitoring, pp. 1-34.

U.S. Appl. No. 15/187,268, filed Jun. 20, 2016 by Zheng Yi Wu et al. for Optimizing Sensor Placement for Structural Health Monitoring Based on Information Entropy or Total Modal Energy, pp. 1-41.

* cited by examiner ns SOFTWARE SYSTEM FOR DYNAMIC
FEATURE EXTRACTION FOR
STRUCTURAL HEALTH MONITORING

BACKGROUND

Technical Field

The present disclosure relates generally to structural health monitoring, and more specifically to techniques for extracting dynamic features from data sets of a structural health monitoring (SHM) system.

Background Information

Structural deterioration is inevitable for structures (e.g., bridges, dams, buildings, etc.) that are subjected to adverse operational and environmental conditions over long service lives. For example, in the year 2006, over 26% of the 600,905 bridges in the U.S. were rated as either structurally deficient or functionally obsolete. As a result of economic considerations, most of these aging structures are still in service. If existing deficiencies are not improved, for example, damage and cracks detected and repaired at an early stage, minor deficiencies may grow and lead to expensive repairs or, if unaddressed for too long, to catastrophic failures.

To try to address these issues, many structures are periodically inspected to determine structural condition. For example, in the case of bridges in the United States, biennial bridge inspection is mandated by the Federal Highway Administration (FHWA). Typically, such inspection is a manual process, performed primarily visually by skilled engineers. The visual inspections are often quite time-consuming and labor-intensive, and even if diligently performed, may miss many types of hidden deterioration. Accordingly, they provide an inadequate and unreliable solution to the problem of detecting structural deterioration.

A number of automated SHM systems have been developed, that have the potential to improve upon visual inspection. A typical SHM system includes a collection of sensors (e.g., accelerometers, strain gauges, corrosion sensors, etc.) placed on a structure, which are connected via cabling to one or more data acquisition units. The SHM system may constantly monitor the structure, and generate data sets. Such data sets may include hundreds or even thousands of records per second, and must be processed to obtain useful information that can be used to evaluate structural condition. Among other types of information, dynamic features of the structure (i.e. features that change under ambient conditions and externally forced conditions), such as frequencies and modal shapes, are embedded in the data sets, and may be extracted from such raw data in a process referred to as feature extraction.

However, extracting dynamic features from data sets of a SHM system often proves challenging for engineers in the field. While certain specific approaches have been developed for particular use cases, there is a lack of a generic approach that can be implemented in a user-friendly software system for extracting dynamic features.

SUMMARY

A software system (also referred to as a "software tool" or simply "tool") is provided for extracting dynamic features from data sets captured by sensors of a SHM system affixed to a structure Such tool may utilize time-domain analysis, frequency domain decomposition and/or an eignensystem realization algorithm. The integrated methods and software may support data sets describing ambient vibrations and/or earthquake-induced vibrations in the structure.

More specifically, in an example embodiment, a dynamic feature extraction tool receives a data set from a SHM system that includes a plurality of sensors affixed to a structure, the data set including at least one of ambient vibration data or earthquake vibration data captured by the sensors. A solution method is selected from among time domain analysis, frequency domain decomposition or eigensystem realization analysis. The dynamic feature extraction tool guides a user to select at least one parameter value used in the selected solution method from a subset of determined-effective parameter values computed by the software tool. For example, if time domain analysis was selected, the dynamic feature extraction tool guides the user to select effective reference degrees of freedom (DOFs), computing a subset of determined-effective reference DOFs from all possible DOFs and guiding the user to select therefrom. The dynamic feature extraction tool then automatically performs the selected solution method on the data set using the selected parameter value(s) to determine the dynamic features (e.g., frequencies or modal shapes), and displays a graphical representation of the dynamic features in a user interface (UI).

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
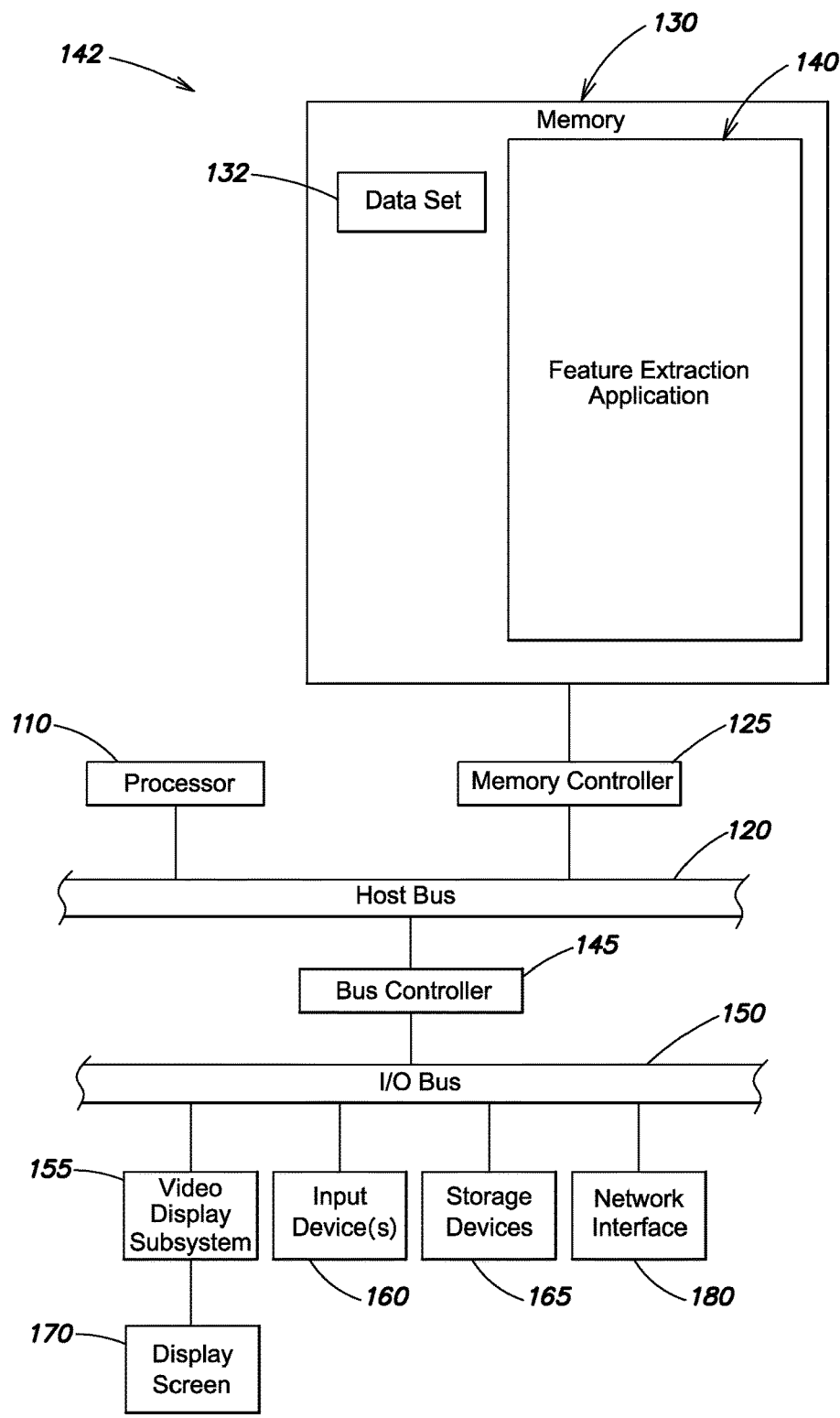
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM) is also coupled to the host bus via a memory controller 125. When in operation, the memory 130 stores software (i.e. processor-executable instructions) and data that are provided to the processor 110. An input/output (I/O) bus 150 is coupled to the host bust 120 via a bus controller 145. A variety of additional components are coupled to the I/O bus 150. For example, a video display subsystem 155 is coupled to the I/O bus 150. The video display subsystem may include a display screen 170 and hardware to drive the display screen. At least one input device 160, such as a keyboard, a touch sensor, a touchpad, a mouse, etc., is also coupled to the I/O bus. A persistent storage device 165, such as a hard disk drive, a solid-state drive, or another type of persistent data store, is further attached, and persistently stores processor-executable instructions and data, that are loaded into the memory 130 when needed. Still further, a network interface 180 is coupled to the I/O bus 150. The network interface enables communication over a computer network, such as the Internet, between the electronic device 100 and other devices, using any of a number of well-known networking protocols. Such communication may enable collaborative, distributed, or remote computing with functionality (including the functionality discussed below) spread across multiple electronic devices.

Working together, the components of the electronic device 100 (and other electronic devices in the case of collaborative, distributed, or remote computing) may execute a number of different software programs. For example, the memory 130 may store at least a portion of software for a dynamic feature extraction software tool 140 used to extract dynamic features, such as frequencies and modal shapes, from a data set 142 captured by sensors of a SHM system. The sensors (e.g., accelerometers of the SHM system (not shown) may be affixed to a structure (e.g., a bridge, dam, building, etc.), and measure vibrations and/or other criteria. The data set 142 may include records that store sensor reading captured by each sensor during a specific period of time (e.g., minutes, hours, etc.) at a specific sampling rate (e.g., 200 data record per second). The period of time may be representative of ambient conditions or include special condition, such an earthquake. According, the data set 142 may take the form of an ambient data set or an earthquake-induced data set, depending upon when it was captured.

The feature extraction tool 140 provides an interface for conducting feature extraction using various types of solution methods, including, for example, time-domain analysis, frequency domain decomposition and eignensystem realization analysis. Each solution method may not be applicable to each type of data set. For instance, for an ambient data set, time-domain analysis or frequency domain decomposition may be applicable. Likewise, for an earthquake-induced data set, eignensystem realization analysis may be applicable. The feature extraction tool 140 may guide the user through a selected solution method, and output results to a file and/or a graphical display in a UI of the feature extraction tool 140.

Figure 2:
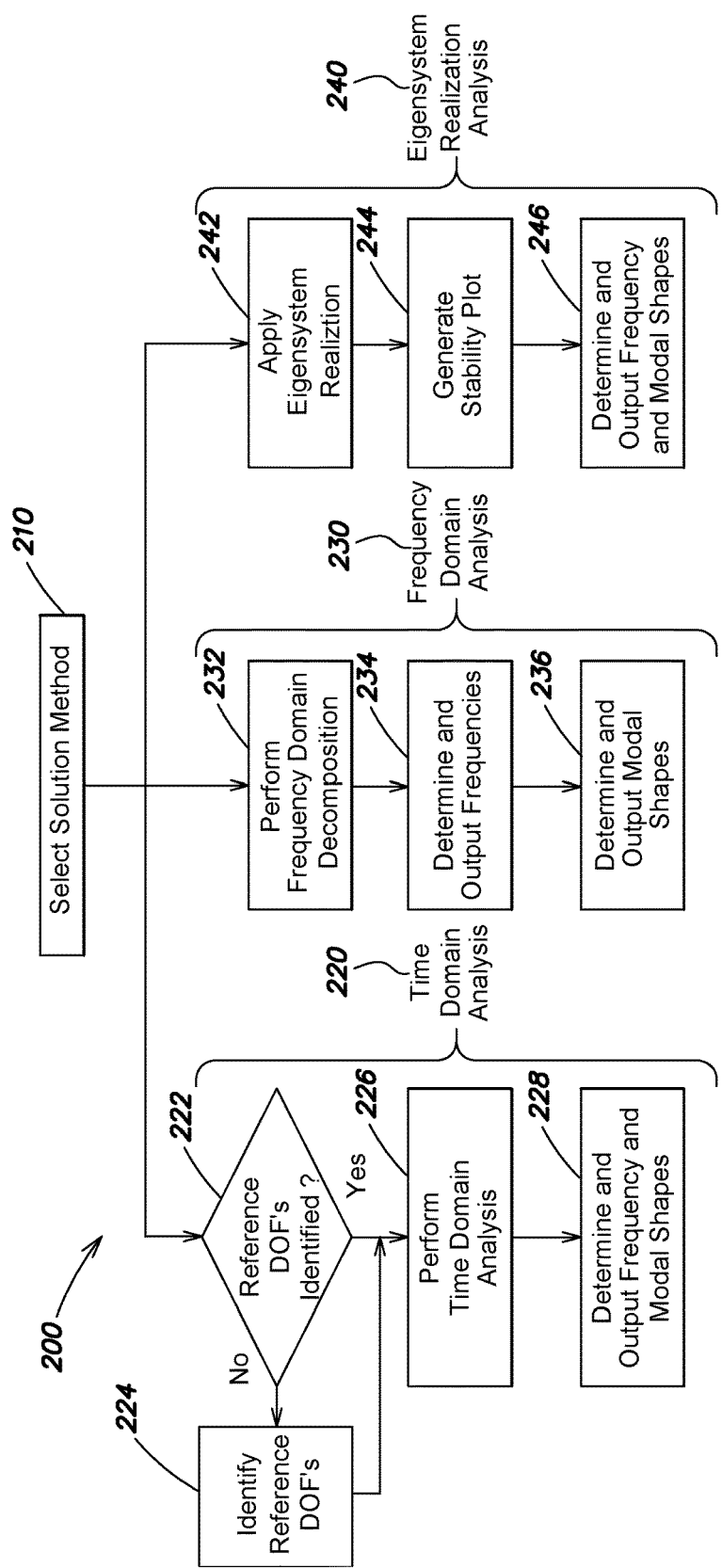
FIG. 2 is a flow diagram of an overall sequence of steps that may be implemented by a feature extraction too.

FIG. 2 is a flow diagram of an overall sequence of steps 200 that may be implemented by the feature extraction tool 140. At step 210, a solution method is selected based on user input received in the UI of the feature extraction tool 140.

Figure 3:
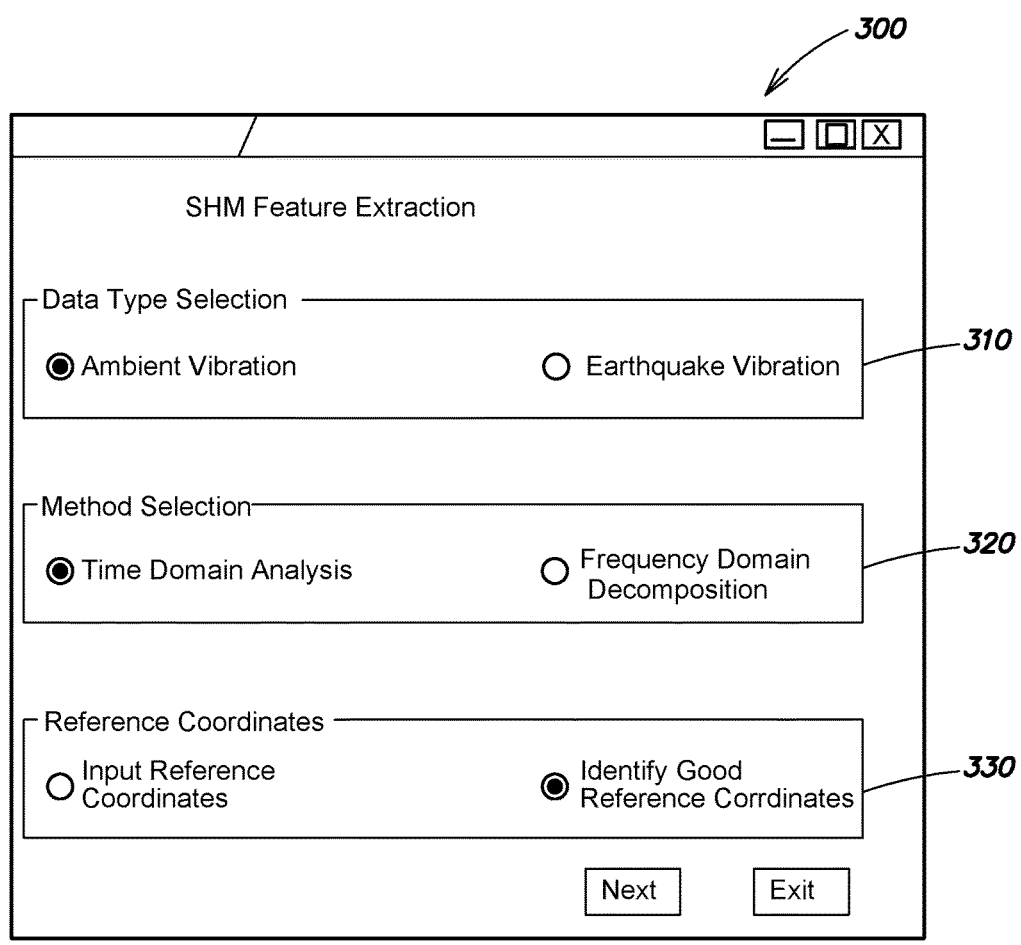
FIG. 3 is an example main menu screen of a UI of the feature extraction tool which may be displayed on a display screen.

FIG. 3 is an example main menu screen 300 of the UI of the feature extraction tool 140 which may be displayed on the display screen 170. A first field 310 is provided to receive user input indicating a type of data set (e.g., an ambient vibration data set or an earthquake-induced data set), a second field 320 may be provided to receive user input indicating an applicable solution method for the selected type of data set (e.g., time-domain analysis or frequency domain decomposition in the case of an ambient vibration data set). If only one solution method is applicable for the selected type of data set, it may be automatically selected (e.g., eignensystem realization analysis in the case of an earthquake-induced data set). A third field 330 is provided to receive user input indicating method-specific settings (e.g., such as regarding reference DOFs in the case of time-domain analysis).

If time-domain analysis is selected in step 210, execution may proceed to the set of steps 220. In general, the set of steps 220 may perform time-domain analysis using a natural excitation technique (NExT) in conjunction with an auto-regressive moving averaging (ARMA) model, and output results in the UI of the feature extraction tool 140. In a NExT/ARMA approach the data set 142 is processed with NExT to calculate correlation functions between the response vector and the response of one or more selected reference DOFs that satisfy the homogenous differential equation of motion. That is, the correlation functions display the same characteristics as the frequency response functions of free vibration. Selecting effective reference DOFs is generally challenging, and the feature extraction tool 140 may guide a user to in this selection. Thereafter, in the NExT/ARMA approach, an ARMA model is used to represent the system, and is identified with a coefficient matrix that is calculated from the correlation functions. Finally, in the NExT/ARMA approach, dynamic features, such as natural frequencies and modal shapes, are estimated from the identified ARMA model.

More specifically, at step 222 it is determined whether reference DOFs have been be identified, and if not execution may proceed to step 224 where effective reference DOFs are identified. To perform such identification, the feature extraction tool 140 may generate a plurality of possible reference DOFs from all available DOFs given a desired number of DOFs. Once this is complete, the feature extraction tool 140 extracts modal frequencies for each combination of possible reference DOFs, treating all the combinations of reference DOFs separately. Thereafter, the feature extraction tool 140 identifies at least one frequency for each mode based on the modal frequencies for each combination of possible reference DOFs. The frequency for each mode may be identified as the one that occurs most frequently among the frequencies. If more than one mode it to be identified, a similar procedure is applied to all the modes. Once this has occurred, the feature extraction tool 140 compares the frequency for each mode to all the frequencies from each different reference DOF, and if the difference is less than a predetermined threshold (e.g., 1%), the reference DOF may be considered to be an effective one.

Figure 4A:
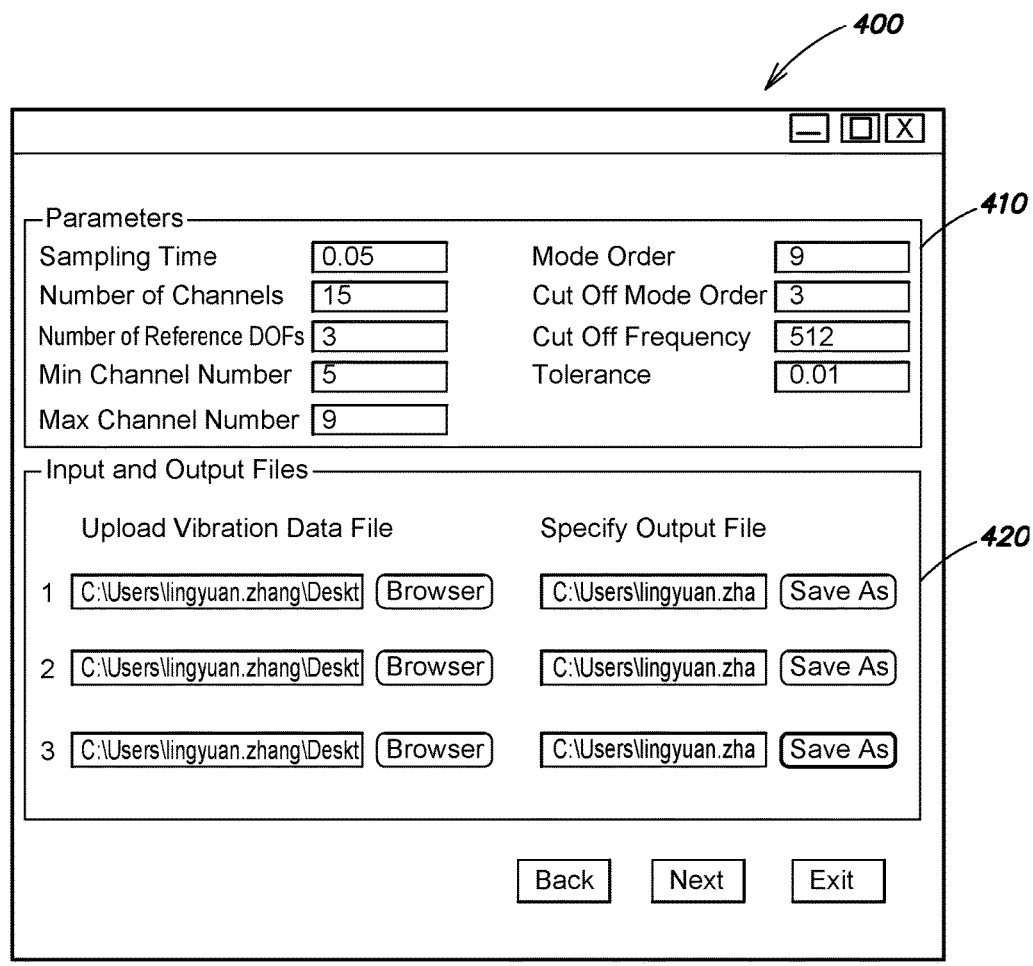
FIG. 4A is an example time domain analysis parameters screen of the UI of the feature extraction tool, which may be displayed on the display screen.

As part of steps 222-224, a number of UI screens may be displayed. FIG. 4A is an example time domain analysis parameters screen 400 of the UI of the feature extraction tool 140, which may be displayed on the display screen 170. A first set of fields 410 are provided to receive user-selected parameters, such as the number of reference DOFs to be identified (e.g., 3). A second set of fields 420 are provided to receive input data files, and output data files where possible reference DOFs are stored.

Figure 4B:
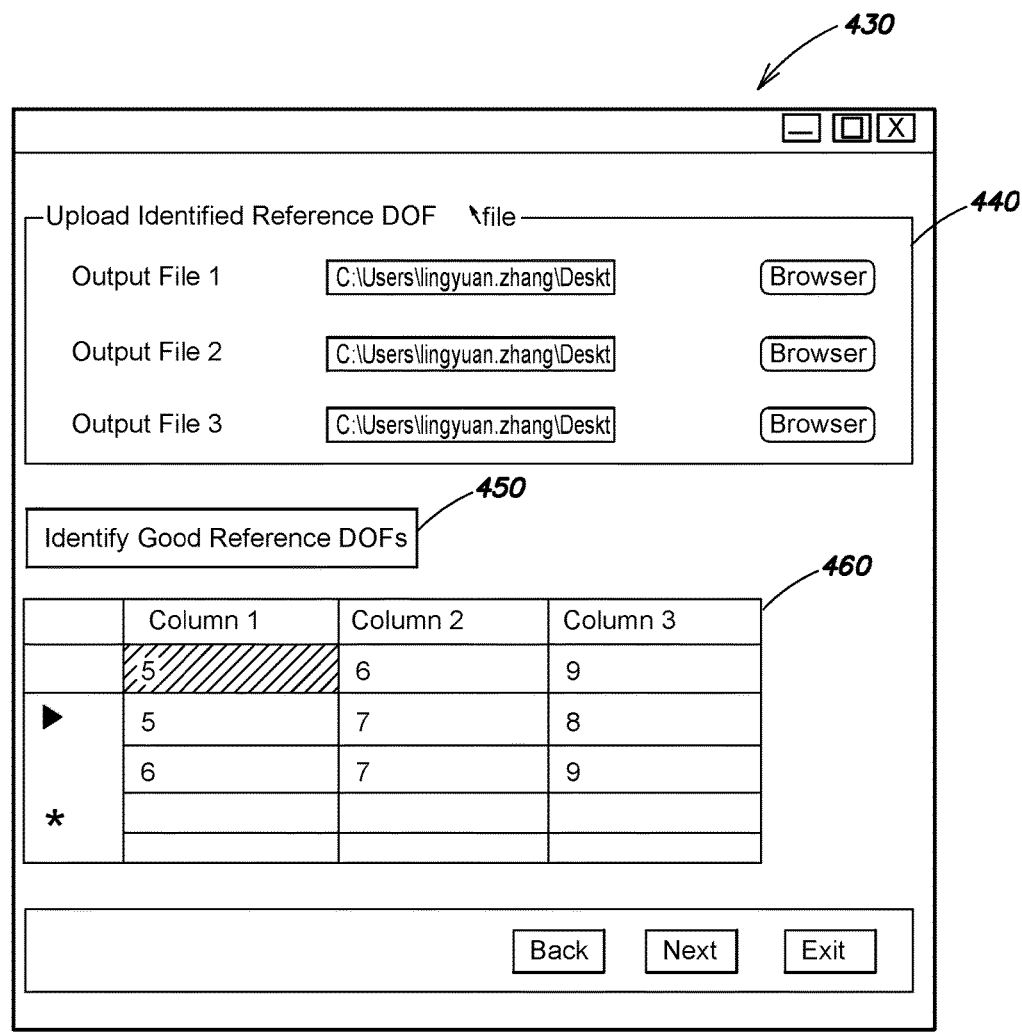
FIG. 4B is an example time domain analysis DOF identification screen of the UI of the feature extraction tool, which may be displayed on the display screen.

FIG. 4B is an example time domain analysis DOF identification screen 430 of the UI of the feature extraction tool 140, which may be displayed on the display screen 170. A first set of fields 440 are provided to receive the output data files produced from FIG. 4A. An element (e.g., a button) 450 is provided to trigger identification of effective reference DOFs. Identified effective reference DOFs are displayed in a table 460 of the UI. A user can select one of the identified effective reference DOFs in the table 460, and proceed to begin time domain analysis.

At step 226 time domain analysis is performed for the selected reference DOF using the NExT/ARMA approach. An ARMA model may generally be defined as follows. For a linear time-invariant system given a general time-series excitation, the observed data $X_t$ can be expressed as:

$$\sum_{k=0}^{N} b_k F_{t-k} = X_t = \sum_{k=1}^{N} a_k X_{t-k} + e(N), (t = 0, \ldots, N) \quad (1)$$

Where $X_{t-k}$ is time-series observed data, $F_{t-k}$ is time-series excitation force, $e(N)$ is measurement noise, $a_k$ is auto-regressive coefficients and $b_k$ is moving average coefficients of the system. For an output-only system, with an assumption of unobserved white noise input and indistinguishable measurement noise, the system can be approximated by:

$$\sum_{k=0}^{N} b_k \sigma^2 \delta_{t-k} = b_t = R_t + \sum_{k=1}^{N} a_k R_{t-k} \quad (2)$$

where $b_t=0$ (when $t>N$). Therefore $\Sigma_{k=0}^{N} b_k \sigma^2 \delta_{t-k}=0$ ($t>N$) can be written as:

$$\begin{bmatrix} R_M & R_{M-1} & \ldots & R_1 \\ R_{M+1} & R_M & \ldots & R_2 \\ \vdots & \vdots & \ldots & \vdots \\ R_{L-1} & R_{L-2} & \ldots & R_{L-M} \end{bmatrix} \begin{bmatrix} a_1 \\ a_2 \\ \vdots \\ a_M \end{bmatrix} = \begin{bmatrix} R_{M+1} \\ R_{M+2} \\ \vdots \\ R_L \end{bmatrix} \quad (3)$$

and the auto-regressive coefficients, $a_k$, can thus be solved. The moving average coefficients, $b_k$, can be solved by:

$$\begin{cases} b_0^2 + b_1^2 + \ldots + b_M^2 = c_0 \\ b_0 b_1 + b_1 b_2 + \ldots + b_{M-1} b_M = c_1 \\ \vdots \\ b_0 b_M = c_M \end{cases} \quad (4)$$

where $$c_k = \sum_{i=0}^{N} \sum_{j=1}^{N} a_i a_j R_{k-i-j} (k = 0, 1, \ldots, N).$$

With the coefficients $a_k$ and $b_k$, the transfer function of the system can be written as:

$$H(z) = \frac{\sum_{k=0}^{N} b_k z^{-k}}{\sum_{k=0}^{N} a_k z^{-k}} \quad (5)$$

and the natural frequencies can be derived from the poles of the transfer function:

$$f_k = \frac{\ln(z_k)}{\Delta t} \quad (6)$$

and vibration modes are given as:

$$V_k = \lim_{z \to z_k} H(z)(z - z_k) \quad (7)$$

Figure 5A:
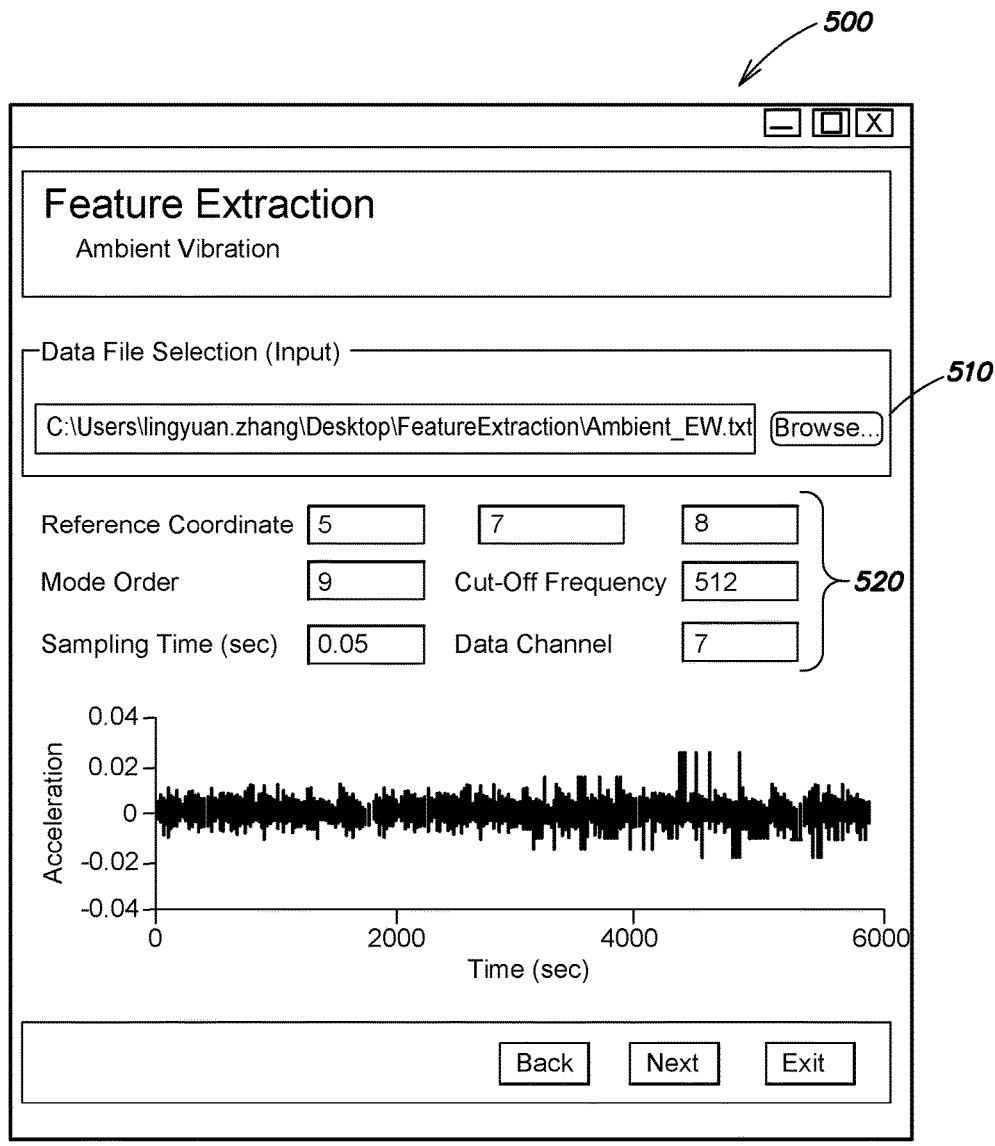
FIG. 5A is an example time domain analysis feature extraction screen of the UI of the feature extraction tool, which may be displayed on the display screen.

At step 228, dynamic features, such as frequencies and modal shapes, are determined and output. FIG. 5A is an example time domain analysis feature extraction screen 500 of the UI of the feature extraction tool 140, which may be displayed on the display screen 170. A field 510 is provided to receive user input indicating a file that stores the data set 142, and fields 520 may receive parameters for the time domain analysis.

Figure 5B:
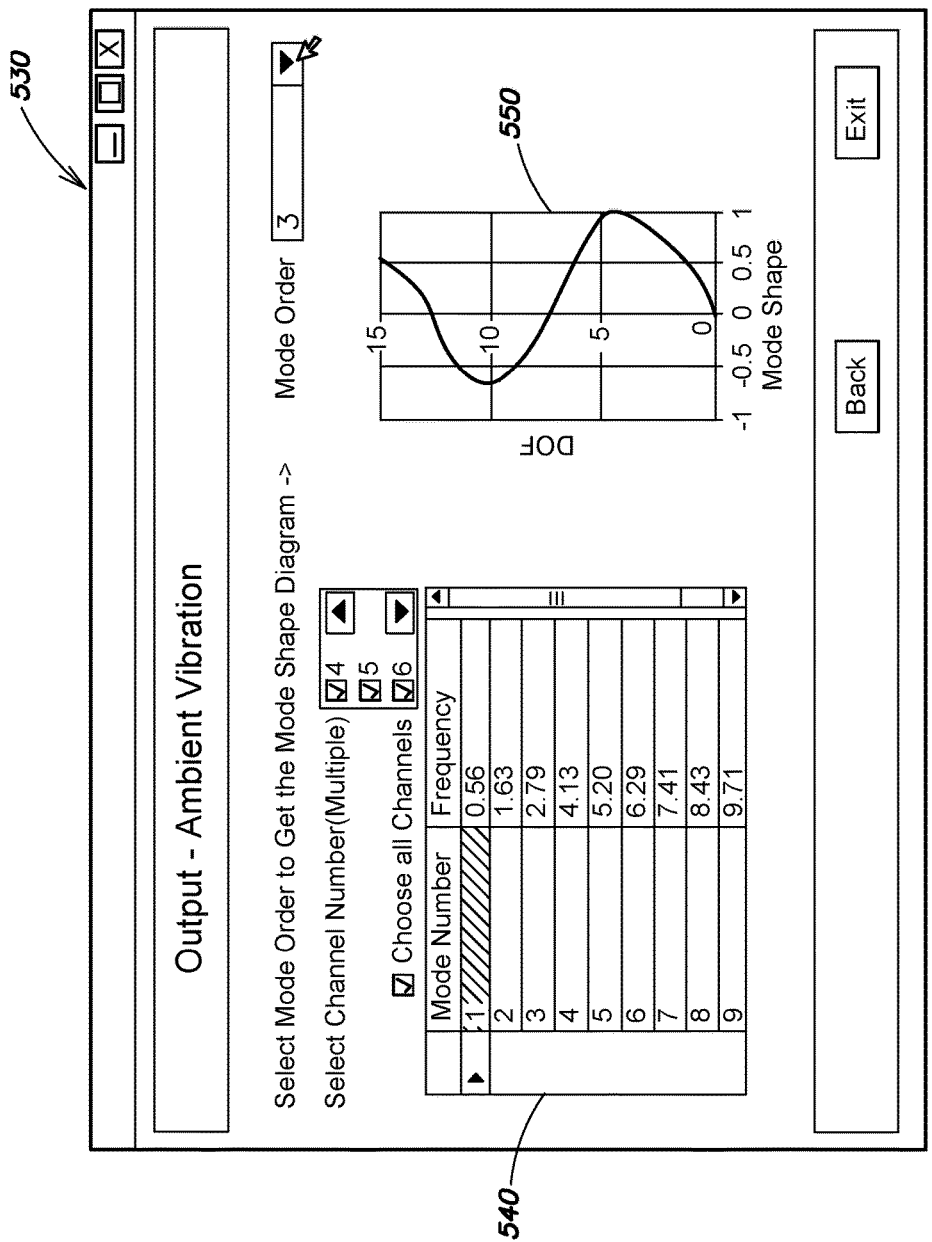
FIG. 5B is an example time domain analysis output screen of the UI of the feature extraction tool, which may be displayed on the display screen.

FIG. 5B is an example time domain analysis output screen 530 of the UI of the feature extraction tool 140, which may be displayed on the display screen 170. A table 540 displays extracted frequencies and corresponding mode numbers, while modal shapes for a selected mode number may be displayed in a graph 550.

Returning back to step 210, if frequency domain decomposition is selected in step 210, execution may proceed to the set of steps 230. At step 232, frequency domain decomposition is performed by of the feature extraction tool 140. In general, relationships between the unknown input x(t) and the measured response y(t) can be expressed in the frequency domain through a frequency response function, such that:

$$G_{yy}(j\omega) = \overline{H}(j\omega) G_{xx}(j\omega) H(j\omega)^T \quad (8)$$

where T denote conjugate and transpose operations, $G_{xx}(j\omega)$ and $G_{yy}(j\omega)$ are the power spectral density matrix of the input and output, respectively, and $H(j\omega)$ is the frequency response function. The frequency response function may be written in partial fractional form as:

$$H(j\omega) = \sum_{k=1}^{n} \frac{R_k}{j\omega - \lambda_k} + \frac{\overline{R}_k}{j\omega - \overline{\lambda}_k} \quad (9)$$

where n is the number of modes, $\lambda_k$ is a pole, and $R_k$ is a residue, given as:

$$R_k = \phi_k \gamma_k^T \quad (10)$$

where $\phi_k$, $\gamma_k^T$ is the modal shape vector and modal participation vector, respectively. Suppose the input is white noise, then the power spectral density matrix is a constant matrix $G_{xx}(j\omega) = C$. The estimate of the output power spectral density matrix at discreet frequencies $\omega = \omega_1$ is then decomposed by taking the singular value decomposition of the matrix:

$$\hat{G}_{yy}(j\omega_i) = U_i S_i U_i^H \quad (11)$$

where the matrix $U_i = [u_{i1}, u_{i2}, K, u_{im}]$ is a unitary matrix holding the singular vectors $u_{i,j}$, and $S_i$ is a diagonal matrix holding the scalar singular value $s_{i,j}$. Near a peak corresponding to the k$^{th}$ mode in the spectrum this or a close mode will be dominating. If only the k$^{th}$ mode is dominating, the first singular vector $u_{t1}$ is an estimate of the modal shape, such that:

$$\hat{\phi} = u_{t1} \quad (12)$$

and the corresponding singular value is the auto power spectral density function of the corresponding single DOF (SDOF). This power density function is identified around the peak by comparing the modal shape estimate $\hat{\phi}$ with the singular vectors for the frequency lines around the peak. As long as a singular vector is found that has a high modal assurance criterion value with $\phi$, the corresponding singular value belongs to the SDOF density function. From the piece of the SDOF density function obtained around the peak of the power spectral density, the frequency and a damping ration can be obtained via inverse Fourier transform from a univariate PSD function back to the time domain.

At step 234, frequencies are determined and displayed to a user. The user may select dominant frequencies as modal frequencies. At step 236, modal shapes are displayed.

Figure 6:
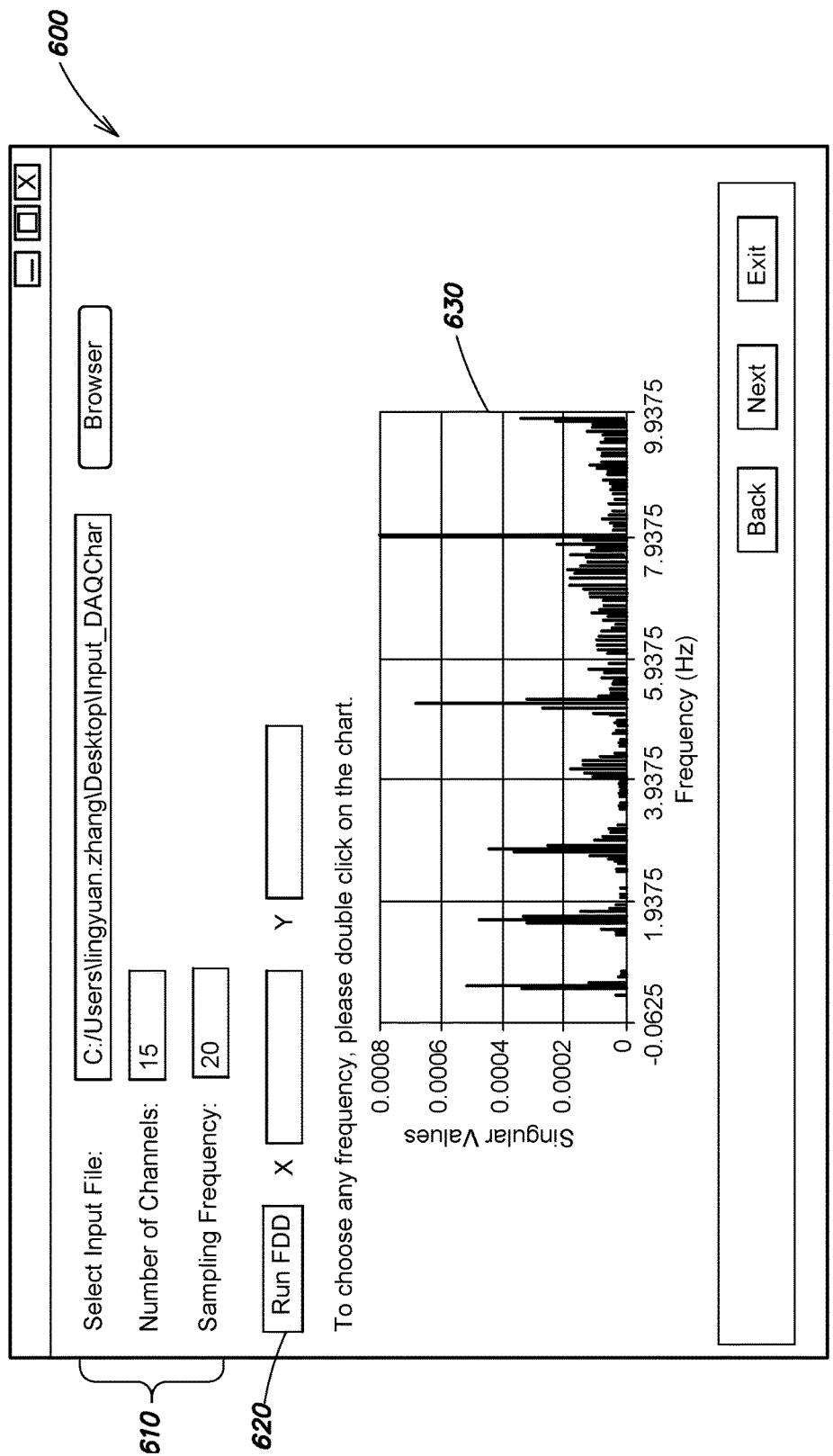
FIG. 6 is an example frequency domain decomposition input/output screen of the UI of the feature extraction tool, which may be displayed on the display screen.

FIG. 6 is an example frequency domain decomposition input/output screen 600 of the UI of the feature extraction tool 140, which may be displayed on the display screen 170. A first set of fields 610 are provided to receive user-selected parameters, such as the location of the data set 142, a number of channels and a sampling frequency. In response to selection of an interface element (e.g., a button) 620, the feature extraction tool 140 performs frequency domain decomposition upon the data set 142, and frequency values are displayed in a graph 630. The user can view and select the dominant frequencies in the graph as modal frequencies. Once these selection has been made, modal shapes for the selected frequencies may be shown.

Figure 7:
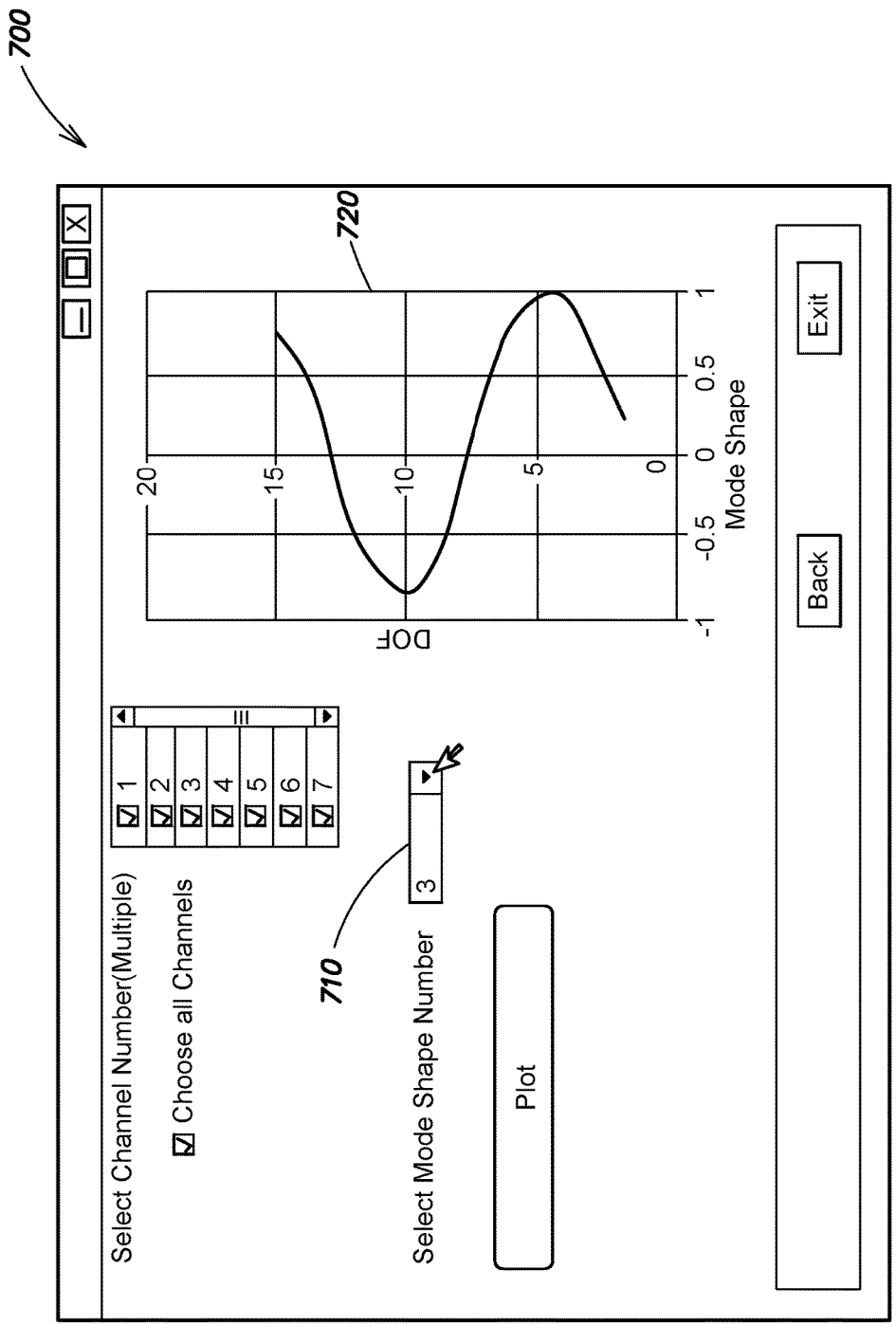
FIG. 7 is an example frequency domain decomposition output screen of the UI of the feature extraction tool, which may be displayed on the display screen to show modal shapes.

FIG. 7 is an example frequency domain decomposition output screen 700 of the UI of the feature extraction tool 140, which may be displayed on the display screen 170 to show modal shapes. An interface element (e.g., a drop down box) 710 is provided to receive a user selection of a mode number for a mode. Mode shapes for the selected mode number are displayed in graph 720.

Returning back to step 210, if eigensystem realization analysis is selected in step 210, execution may proceed to the set of steps 240. At step 242, eigensystem realization is applied by the feature extraction tool 140. In general, eigensystem realization analysis uses the principles of minimum realization to obtain a state-space representation of the structure, and dynamic features, such as frequencies and modal shapes may be determined therefrom. To perform eigensystem realization analysis, a Henkel matrix may be formed such that:

$$H(k) = \begin{bmatrix} y(k+1) & y(k+2) & \ldots & y(k+m) \\ y(k+2) & y(k+3) & \ldots & y(k+m+1) \\ & & \ddots & \\ y(k+n) & y(k+n+1) & \ldots & y(k+m+n) \end{bmatrix} \quad (13)$$

where the number of rows and columns in the Henkel matric n×N and M respectively, and N is the number of sensors. A singular value decomposition of H(0) is given as:

$$H(0) = R\Sigma S^T \quad (14)$$

where H(0) is the Henkel matrix at k=0, R and S are m by m and n by n orthonormal matrices respectively, and $\Sigma$ is a m by n matrix with nonnegative numbers in the diagonal. A minimum realization is obtained by eliminating the smaller signal values, resulting in a minimum order system that represents the structure. System matrices A and C may be calculated as:

$$A = \Sigma^{-\frac{1}{2}} R^T H(1) S \Sigma^{-\frac{1}{2}} \quad (15)$$

$$C = E^T R \Sigma^{\frac{1}{2}} \quad (16)$$

where the small singular values have been eliminated from the matrix $\Sigma$ and E=[I 0] with I being an m by m identity matrix and 0 a matrix of appropriate dimensions. The eigenvalues of A are complex conjugates, and each complex conjugate corresponds to one mode of vibration.

At step 244, after eigensystem realization analysis has been performed, stability plots are generated. Finally, at step 246 dynamic features, such as frequencies and modal shapes, determined from the eigensystem realization analysis and the stability plots are output.

In summary, the above description details a software tool for extracting dynamic features from data sets captured by sensors of a SHM system affixed to a structure. It should be understood that various adaptations and modifications may be readily made to, to suit various implementations. Further, it should be understood that at least some of the techniques described as implemented in software may be implemented in hardware, or a combination thereof. In general, a software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more specially configured hardware components, for example, processors. Accordingly, it should be understood that the above descriptions are meant to be taken only by way of example.

What is claimed is:

1. A method for extracting dynamic features from data sets captured by sensors of a structural health monitoring system (SHM) system affixed to a structure, comprising:
  receiving, by a software tool executing on an electronic device, a data set from the SHM system, the data set including at least one of ambient vibration data or earthquake vibration data captured by the sensors of the SHM affixed to the structure;
  selecting a solution method in response to user input received in a user interface (UI) of the software tool shown on a display screen of the electronic device, the solution method including at least one of time domain analysis or frequency domain decomposition;
  guiding a user to select at least one parameter value from a subset of determined-effective parameter values computed by the software tool, the subset of determined-effective parameter values being less than all possible parameter values for an associated parameter;
  automatically performing, by the software tool, the selected solution method on the data set using the selected at least one parameter value to determine the dynamic features; and displaying a graphical representation of the dynamic features in the UI of the software tool,
wherein the dynamic features include at least frequencies or modal shapes for the structure.

2. The method of claim 1, wherein the solution method includes time domain analysis, frequency domain decomposition, and eigensystem realization analysis.

3. The method of claim 2, wherein the data set includes ambient vibration data and the solution method is selected in response to a user input affirmatively selecting time domain analysis or frequency domain decomposition.

4. The method of claim 2, wherein the data set includes earthquake vibration data and the solution method is automatically selected to be eigensystem realization analysis in response to user input indicating the data set includes earthquake vibration data.

5. The method of claim 1, wherein the selected solution method is time domain analysis, and the determined-effective parameter is a set of determined-effective reference degrees of freedom (DOFs), and the method further comprises:
generating a plurality of possible reference DOFs from all available DOFs;
extracting modal frequencies for each combination of possible reference DOFs;
identifying at least one frequency for each mode based on the modal frequencies for each combination of possible reference DOFs;
comparing the at least one frequency for each mode to all the frequencies from each different reference DOF, and if the difference is less than a predetermined threshold, selecting the reference DOF as a member of the set of determined-effective reference DOFs.

6. The method of claim 5, further comprising:
displaying the set of determined-effective reference DOFs to the user in the UI of the software tool; and
receiving a user-selection of a determined-effective reference DOF from the displayed set of determined-effective reference DOFs, and using the user-selected determined-effective reference DOF to perform the time domain analysis.

7. The method of claim 1, wherein the dynamic features include both frequencies and modal shapes, and the method further comprises
displaying frequencies and corresponding mode numbers in the UI of the software tool;
receiving a user selection of a mode number; and
displaying a graph showing modal shapes for the selected mode number in the UI of the software tool.

8. The method of claim 1, wherein the selected solution method is frequency domain decomposition, and the method further comprises:
determining frequencies using an inverse Fourier transform from a univariate power spectral density function (PSD) function; and
displaying the frequencies to the user in the UI of the software tool.

9. The method of claim 1, wherein the dynamic features include both frequencies and modal shapes, and the method further comprises:
receiving a user selection of a mode number for a frequency; and
displaying a graph showing modal shapes for the selected mode number in the UI of the software tool.

10. The method of claim 1, wherein the sensors comprise accelerometers.

11. The method of claim 1, wherein structure is a bridge, a dam, or a building.

12. An system for extracting dynamic features from data sets, comprising:
a structural health monitoring system (SHM) that includes a plurality of sensors affixed to a structure, the plurality of sensors configured to measure vibrations in the structure under at least one of ambient conditions or earthquake-induced conditions to produce a data set including at least one of ambient vibration data or earthquake vibration data; and
an electronic device coupled to the SHM system and including a display screen, a processor, and a memory configured to store a software tool, the software tool when executed on the processor operable to:
receive a user selection of a solution method in response to user input received in a user interface (UI) shown on the display screen of, the solution method including at least one of time domain analysis or frequency domain decomposition,
automatically perform the selected solution method on the data set to determine the dynamic features, and
display a graphical representation of the dynamic features in the UI,
wherein the dynamic features include at least frequencies or modal shapes for the structure.

13. The system of claim 12, wherein the solution method includes time domain analysis, frequency domain decomposition, and eigensystem realization analysis.

14. The system of claim 13, wherein the data set includes ambient vibration data and the software tool when executed is further operable to select time domain analysis or frequency domain decomposition in response to an affirmative user selection of the solution method.

15. The system of claim 13, wherein the data set includes earthquake vibration data and the software tool when executed is further operable to automatically select eigensystem realization analysis in response to user input indicating the data set includes earthquake vibration data.

16. The system of claim 12, wherein the software tool when executed is further operable to guide a user to select at least one parameter value used in the selected solution method from a subset of determined-effective parameter values computed by the software tool, the subset of determined-effective parameter values being less than all possible parameter values for an associated parameter.

17. The system of claim 12, wherein the selected solution method is time domain analysis, the time domain analysis utilizes a set of determined-effective reference degrees of freedom (DOFs), and the software tool when executed is further operable to:
generate a plurality of possible reference DOFs from all available DOFs;
extract modal frequencies for each combination of possible reference DOFs;
identify at least one frequency for each mode based on the modal frequencies for each combination of possible reference DOFs; and
compare the at least one frequency for each mode to all the frequencies from each different reference DOF, and if the difference is less than a predetermined threshold, select the reference DOF as a member of the set of determined-effective reference DOFs.

18. The system of claim 12, wherein the sensors comprise accelerometers.

19. The system of claim 12, wherein the structure is a bridge, a dam, or a building.

20. A non-transitory electronic device-readable medium having executable instructions stored thereon, the instructions when executed by one or more processors being operable to
- extract dynamic features from data sets captured by sensors of a structural health monitoring system (SHM) system affixed to a structure, the instructions comprising instructions to:
- receive, a data set from the SHM system that includes the plurality of sensors affixed to the structure, the data set including at least one of ambient vibration data or earthquake vibration data captured by the sensors;
- guide a user to select at least one parameter value used from a subset of determined-effective parameter values determined by the software tool, the subset of determined-effective parameters being less than all possible parameter values for an associated parameter;
- automatically perform a solution method on the data set using the selected at least one parameter value to determine the dynamic features, the solution method including at least one of time domain analysis or frequency domain decomposition; and
- display a graphical representation of the dynamic features in a user interface (UI),
- wherein the dynamic features include at least frequencies or modal shapes for the structure.

* * * * *

UNITED STATES PATENT AND TRADEMARK OFFICE
CERTIFICATE OF CORRECTION

PATENT NO. : 9,983,776 B1
APPLICATION NO. : 15/199409
DATED : May 29, 2018
INVENTOR(S) : Zheng Yi Wu et al.

Page 1 of 1

It is certified that error appears in the above-identified patent and that said Letters Patent is hereby corrected as shown below:

In the Specification

Column 5, Line 39 reads:
"where $b_t = 0$ (when t >N). Therefore $\Sigma_{k=0}^{N} b_k \sigma^2 \delta_{t-k} = 0$ (t > N)"
Should read:
--where $b_t = 0$ (when t >N). Therefore $\sum_{k=0}^{N} b_k \sigma^2 \delta_{t-k} = 0$ (t > N)--

Column 6, Line 61 reads:
"sity matrix at discreet frequencies $\omega = \omega_1$ is then decomposed"
Should read:
--sity matrix at discreet frequencies $\omega = \omega_i$ is then decomposed--

Column 6, Lines 66-67 reads:
"holding the singular vectors $u_{i,j}$, and $S_i$ is a diagonal matrix holding the scalar singular value $s_{i,j}$. Near a peak corre-"
Should read:
--holding the singular vectors $u_{ij}$, and $S_i$ is a diagonal matrix holding the scalar singular value $s_{ij}$. Near a peak corre- --

Column 7, Lines 5-6 reads:
"$\hat{\phi} = u_{t1}$ (12)"
Should read:
-- $\hat{\phi} = u_{i1}$ (12)--

Signed and Sealed this
Eighth Day of October, 2019

Andrei Iancu
*Director of the United States Patent and Trademark Office*